(12) United States Patent
Fitzner

(10) Patent No.: US 9,976,528 B1
(45) Date of Patent: May 22, 2018

(54) HIGH-PRESSURE PUMP ARRANGEMENT FOR A COMBUSTION ENGINE AND METHOD FOR MANUFACTURING THE SAME

(71) Applicants: Hyundai Motor Europe Technical Center GmbH, Russelsheim (DE); HYUNDAI MOTOR COMPANY, Seoul (KR); KIA MOTORS CORPORATION, Seoul (KR)

(72) Inventor: Stephan Fitzner, Langen (DE)

(73) Assignees: HYUNDAI MOTOR EUROPE TECHNICAL CENTER GMBH, Russelsheim (DE); HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days. days.

(21) Appl. No.: 15/373,121

(22) Filed: Dec. 8, 2016

(30) Foreign Application Priority Data

Nov. 2, 2016 (DE) .......................... 10 2016 221 497

(51) Int. Cl.
*F02M 59/00* (2006.01)
*F02M 59/44* (2006.01)
*F02M 59/48* (2006.01)

(52) U.S. Cl.
CPC .......... *F02M 59/445* (2013.01); *F02M 59/48* (2013.01)

(58) Field of Classification Search
CPC .............................. F02M 59/445; F02M 59/48

USPC .................................................. 123/445, 509
See application file for complete search history.

(56) References Cited

U.S. PATENT DOCUMENTS

| 4,508,072 A | * | 4/1985 | Takami | F02F 7/0073 |
| | | | | 123/195 A |
| 4,917,069 A | * | 4/1990 | Kuhlen | F02M 37/04 |
| | | | | 123/198 C |
| 4,976,246 A | * | 12/1990 | Schierling | F02B 33/04 |
| | | | | 123/41.31 |
| 5,105,778 A | * | 4/1992 | Svensson | F02B 63/02 |
| | | | | 123/195 C |
| 5,603,304 A | * | 2/1997 | Matczak | F02M 37/043 |
| | | | | 123/509 |
| 6,260,471 B1 | * | 7/2001 | Tanaka | F02M 59/102 |
| | | | | 92/169.1 |
| 6,334,433 B1 | * | 1/2002 | Sumida | F02M 61/14 |
| | | | | 123/470 |
| 6,412,450 B1 | | 7/2002 | Jaasma | |
| 2007/0228668 A1 | * | 10/2007 | Dempsey | F16J 15/104 |
| | | | | 277/627 |

(Continued)

FOREIGN PATENT DOCUMENTS

| DE | 102013211681 A1 | 12/2014 |
| JP | 5737271 B2 | 6/2015 |
| KR | 10-1224965 B1 | 1/2013 |

*Primary Examiner* — Thomas Moulis
(74) *Attorney, Agent, or Firm* — McDermott Will & Emery LLP

(57) ABSTRACT

A high-pressure pump arrangement for a combustion engine comprises a high-pressure pump with the first flange, a pump guidance with a second flange. The high-pressure pump is at least partially arranged in the pump guidance and the pump guidance is arranged in the combustion chamber. A first thermally insulating layer is at least partially arranged between the first flange and the second flange.

10 Claims, 1 Drawing Sheet

(56) References Cited

U.S. PATENT DOCUMENTS

| | | | |
|---|---|---|---|
| 2012/0006304 A1* | 1/2012 | Wakabayashi | F02F 7/006 123/509 |
| 2012/0195780 A1* | 8/2012 | Matsumoto | F04B 1/0404 417/559 |
| 2013/0213723 A1 | 8/2013 | Kaneko | |
| 2015/0159524 A1* | 6/2015 | Kawakami | F01L 1/46 123/90.37 |
| 2016/0076538 A1* | 3/2016 | Flo | F02M 59/102 417/454 |
| 2016/0160823 A1* | 6/2016 | Tansug | F04B 1/0404 417/274 |
| 2016/0208758 A1* | 7/2016 | Nigrin | F02M 53/00 |

* cited by examiner

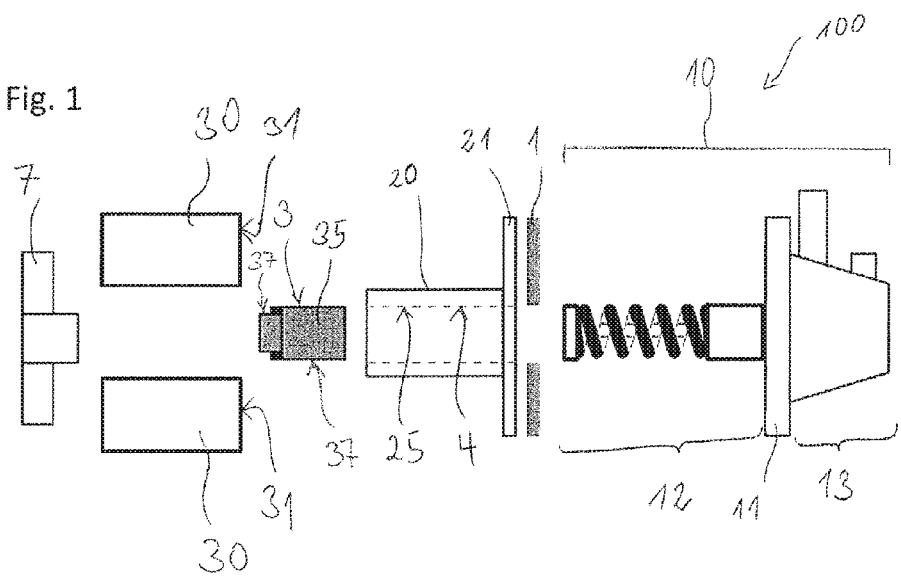
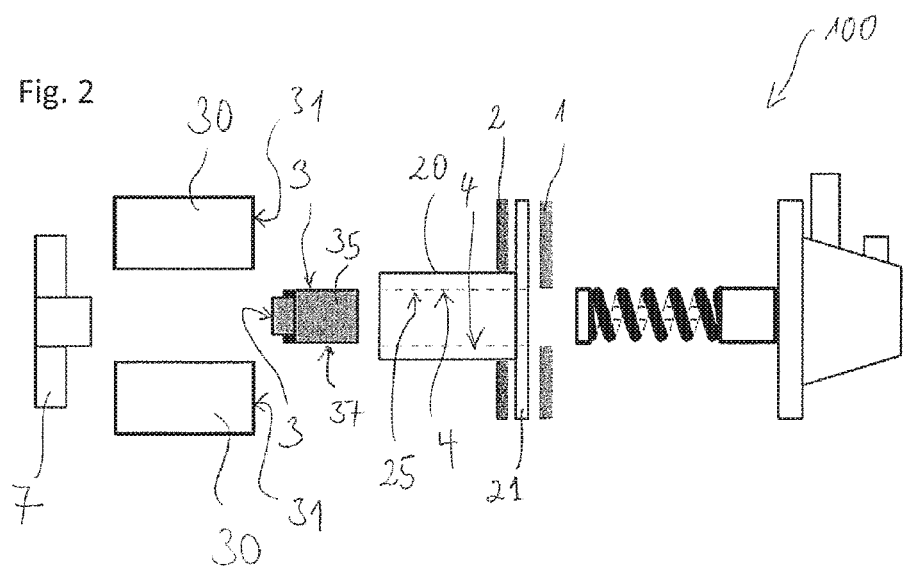

HIGH-PRESSURE PUMP ARRANGEMENT FOR A COMBUSTION ENGINE AND METHOD FOR MANUFACTURING THE SAME

CROSS-REFERENCE(S) TO RELATED APPLICATION

This application claims the benefit of priori to German Patent Application No. 102016221497.7, filed on Nov. 2, 2016, which is incorporated herein by reference in its entirety.

TECHNICAL FIELD

The present disclosure relates to a high-pressure pump arrangement for a combustion engine and a method for manufacturing the same.

BACKGROUND

Typically, direct high-pressure injection of internal combustion engines requires a pressurized fuel produced in high-pressure pumps. The fuel pressure in gasoline engines are typically between 200 and 350 bar. Common rail diesel engines achieve typically pressures of 1800 up to 3000 bar.

Therefore, housings for high-pressure pumps have been developed to encounter the high-pressure during operation of the high-pressure pump in the combustion chamber. Especially, in common rail diesel engines the requirements for such housings are very high due to the very high pressure. To improve the integration of high-pressure pumps into the combustion engine and combustion chamber, respectively, unit-pumps are known. Unit-pumps are lubricated by oil instead of fuel, in particular engine oil.

However, heating-up of in particular fuel during operation of the high-pressure pump is still a challenge. Thus, efforts are conducted to reduce the heating-up of oil or fuel and improve in particular lubricity within the high-pressure pump.

Consequently, there is a need to develop a high-pressure pump arrangement such that a heating-up of the high-pressure pump can be reduced, and thus, there is a high-pressure pump arrangement needed which is able to overcome the heating-up of fuel, in a simple and cost-efficient manner.

SUMMARY

An aspect of the present disclosure provides a high-pressure pump arrangement and a method for manufacturing the high-pressure pump arrangement.

According to an exemplary embodiment of the present disclosure, a high-pressure pump arrangement for a combustion engine includes: a high-pressure pump having a first flange; and a pump guidance having a second flange. The high-pressure pump may be at least partially disposed in the pump guidance. The pump guidance may be disposed in the combustion engine. A first thermally insulating layer may be at least partially arranged between the first flange and the second flange.

According to the exemplary embodiment, the high-pressure pump arrangement is integrated or installed in an engine compartment of a vehicle. The high-pressure pump may comprise a pumping element and a unit-pump. The unit-pump may be at least partially arranged, plugged in, or inserted in the pump guidance, and the pumping element remains substantially outside the pump guidance.

An aspect of the present disclosure provides thermally insulating layers to substantially thermally isolate or thermally decouple the high-pressure pump and its corresponding components, such as the unit-pump and the pumping element, from the combustion engine during operation of the combustion engine. In other words, the high-pressure pump arrangement can reduce or substantially prevent a heating-up of the fuel. Consequently, the high-pressure pump arrangement, in particular the high-pressure pump, operates under reduced temperature as well as reduced heating-up of a general transfer media or lubricant, for example engine oil.

Especially, in a common rail diesel engine, the required lubricity for a proper function of the high-pressure pump can be therefore easily provided by the here described high-pressure pump arrangement. Further, the pressurized fuel has a lower temperature during operation. This results in an improved robustness of the corresponding components of the high-pressure pump arrangement. In addition, reduced fuel deterioration by lower oxidation can be obtained since the temperature of the fuel can be reduced which results in an increased injector stability. This can in particular result in lowered cavitation tendency inside injector servo hydraulic components, also called as micro-combustion.

According to another exemplary embodiment of the present disclosure, a method for manufacturing a high-pressure pump arrangement includes: arranging a high-pressure pump with the first flange into a pump guidance with a second flange, such that the first thermally insulating layer is at least partially arranged between the first flange and the second flange; and arranging the pump guidance with the second flange into the combustion engine.

According to the exemplary embodiment, the high-pressure pump may comprise a tappet which is at least partially movable within the pump guidance. The tappet can be therefore guided by the pump guidance. Further the tappet or a roller tappet of the tappet may interact with a camshaft, in which the camshaft is integrated into an engine mechanic of the combustion engine.

A second thermally insulating layer may be at least partially arranged between the second flange and the combustion engine.

By arranging the second thermally insulating layer between the second flange and the combustion engine an additional thermal isolation or thermal decouple from the combustion engine can be easily realized.

Surfaces of the tappet may comprise at least partially a third thermally insulating layer.

Therefore, moving parts, in particular the tappet and the unit-pump of the high-pressure pump are thermally decoupled from each other and a heat transfer between the moving parts can be reduced or prevented. Additionally, by using corresponding materials also friction reduction between the corresponding components can be realized.

An inner surface of the pump guidance may comprise at least partially a fourth thermally insulating layer.

Therefore, the pump guidance which is arranged, plugged-in or inserted in the combustion engine can be additionally thermally isolated from the temperature of the combustion engine during operation. In Addition, a further friction reduction between the inner surface of the pump guidance and the tappet can be realized.

The first thermally insulating layer and the second thermally insulating layer may comprise rubber layers.

By using rubber layers or plastic material additional damping qualities besides the thermal isolation can be easily realized. Alternatively, materials of the first and second thermally insulating layers are different from each other.

The third thermally insulating layer and the fourth thermally insulating layer may comprise ceramic materials and/or diamond-like carbon.

Ceramic materials as well as diamond-like carbon have a secondary effect by very low friction. Therefore, it is possible to reduce the $CO_2$ emission of an entire power train of a vehicle. Alternatively, materials of the third and fourth thermally insulating layers are different from each other.

The second thermally insulating layer may be at least partially arranged between the second flange and the combustion engine.

An inner surface of the pump guidance may be coated at least partially with a fourth thermally insulating layer.

The here described features for the high-pressure pump arrangement is also disclosed for the method for manufacturing the high-pressure pump arrangement and vice versa.

BRIEF DESCRIPTION OF THE DRAWINGS

FIG. 1 schematic exploded view of a high-pressure pump arrangement according to a first embodiment of the present disclosure.

FIG. 2 schematic exploded view of a high-pressure pump arrangement according to a second embodiment of the present disclosure.

Unless indicated otherwise, like reference numbers to the figures indicate like elements.

DETAILED DESCRIPTION OF THE EMBODIMENTS

The schematic exploded view is chosen for the sake of a better understanding of this invention. It is clear from the context that the here described components of the high-pressure pump arrangement are arranged to each other as described above.

FIG. 1 illustrates a schematic exploded view of a high-pressure pump arrangement for a combustion engine according to a first embodiment of the present disclosure.

A high-pressure pump arrangement 100 for a combustion engine comprises a high-pressure pump 10 with a flange 11, a unit-pump 12, and a pumping element 13. The pumping element 13 remains substantially outside a pump guidance 20. The unit-pump 12, which is a part of the high-pressure pump 10, is plugged-in or inserted in the pump guidance 20. In other words, the flange 11 of the high-pressure pump 10 and the second flange 21 of the pump guidance 20 are mechanically, in particular, exclusively mechanically, connected to each other. Between the first flange 11 and the second flange 21, a first thermally insulating material and/or layer 1 is arranged such that the pumping element is substantially thermally isolated from the flange 21 of the pump guidance 20. The pump guidance 20 is arranged in the combustion engine. The second flange 21 is in direct contact with an outer surface 31 of the combustion engine 30.

As illustrated in FIG. 1, the combustion engine 30 with its outer surface 31, the pump guidance 20 with its second flange 21 and the high-pressure pump 10 with its first flange 11 are connected to each other, wherein the unit-pump 12 is arranged within the pump guidance 20.

As illustrated in FIG. 1 the high-pressure pump arrangement can further comprise a tappet 35, wherein the tappet 35 is at least partially movable within the pump guidance 20. Further the tappet 35 or rather a roller tappet of the tappet 35 interacts with a camshaft 7, wherein the camshaft 7 is integrated into an engine mechanic of the combustion engine 30. Corresponding surfaces 37 of the tappet 35 comprise at least partially a third thermally insulating material and/or layer 3. Therefore, moving parts, in particular, the tappet 35 and the unit-pump 12 of the high-pressure pump 10 are thermally decoupled from each other and a heat transfer between the moving parts can be reduced or prevented.

As illustrated in FIG. 1 an inner surface 25 of the pump guidance 20 comprises at least partially a fourth thermally insulating material and/or layer 4. Therefore, the pump guidance 20 which is arranged, plugged-in or inserted in the combustion engine 30 can be additionally thermally isolated from the temperature of the combustion engine 30 during operation. In addition, a friction reduction between the inner surface 25 of the pump guidance 20 and the tappet 35 can be realized.

FIG. 2 illustrates a schematic exploded view of a high-pressure pump arrangement according to a second embodiment of the present disclosure.

FIG. 2 is substantially based on FIG. 1 with the difference that additionally a second thermally insulating material and/or layer 2 is at least partially arranged between the second flange 21 of the pump guidance 20 and the outer surface 31 of the combustion engine block 30.

Although the here afore-mentioned high-pressure pump arrangement has been described in connection to automobiles, accordingly. For a person skilled in the art it is clearly and unambiguously understood that the here described high-pressure pump arrangement can be applied to various object which comprises combustion engines.

What is claimed is:

1. A high-pressure pump arrangement for a combustion engine comprising:
   a high-pressure pump having a first flange; and
      a pump guidance having a second flange,
      wherein the high-pressure pump is at least partially arranged in the pump guidance,
      wherein the pump guidance is arranged in the combustion engine, and
         wherein a first thermally insulating layer is at least partially arranged between the first flange and the second flange.

2. The high-pressure pump arrangement according to claim 1, wherein the high-pressure pump comprises a tappet that is at least partially movable within the pump guidance.

3. The high-pressure pump arrangement according to claim 1, wherein a second thermally insulating layer is at least partially arranged between the second flange and the combustion engine.

4. The high-pressure pump arrangement according to claim 1, wherein surfaces of the tappet comprise at least partially a third thermally insulating layer.

5. The high-pressure pump arrangement according to claim 1, wherein an inner surface of the pump guidance comprises at least partially a fourth thermally insulating layer.

6. The high-pressure pump arrangement according to claim 3, wherein the first thermally insulating layer and the second thermally insulating layer comprise rubber layers.

7. The high-pressure pump arrangement according to claim 1, wherein the third thermally insulating layer and the fourth thermally insulating layer comprise at least one of ceramic materials and diamond-like carbon.

8. A method for manufacturing a high-pressure pump arrangement for a combustion engine, the method comprising the steps of:

arranging a high-pressure pump with a first flange into a pump guidance with a second flange, such that a first thermally insulating layer is at least partially arranged between the first flange and the second flange; and
arranging the pump guidance with the second flange into the combustion engine.

9. The method according to claim 8, wherein a second thermally insulating layer is at least partially arranged between the second flange of the pump guidance and the combustion engine.

10. The method according to claim 9, wherein an inner surface of the pump guidance is coated at least partially with a fourth thermally insulating layer.

\* \* \* \* \*